(12) United States Patent
Okado

(10) Patent No.: US 8,441,561 B2
(45) Date of Patent: May 14, 2013

(54) IMAGE PICKUP APPARATUS AND CONTROL METHOD THAT CORRECT IMAGE DATA TAKEN BY IMAGE PICKUP APPARATUS

(75) Inventor: Teruyuki Okado, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 272 days.

(21) Appl. No.: 12/838,178

(22) Filed: Jul. 16, 2010

(65) Prior Publication Data

US 2011/0019036 A1    Jan. 27, 2011

(30) Foreign Application Priority Data

Jul. 24, 2009    (JP) ................................. 2009-173000

(51) Int. Cl.
*H04N 9/64* (2006.01)
*H04N 5/225* (2006.01)

(52) U.S. Cl.
USPC ...................................... 348/243; 348/207.99

(58) Field of Classification Search ........... 348/241–251
See application file for complete search history.

(56) References Cited

U.S. PATENT DOCUMENTS

| | | | |
|---|---|---|---|
| 7,679,658 B2 | 3/2010 | Sakurai et al. | |
| 2006/0232692 A1* | 10/2006 | Takane | 348/248 |
| 2007/0076107 A1* | 4/2007 | Nishimura | 348/294 |
| 2008/0197268 A1* | 8/2008 | Kameda | 250/208.1 |
| 2009/0012606 A1* | 1/2009 | Pacetti | 623/1.43 |
| 2009/0091641 A1* | 4/2009 | Hattori | 348/241 |
| 2009/0290049 A1* | 11/2009 | Ukita | 348/243 |

FOREIGN PATENT DOCUMENTS

| | | | |
|---|---|---|---|
| JP | 2005-175930 | * | 6/2005 |
| JP | 2007-027845 | | 2/2007 |
| JP | 2007-158626 | | 6/2007 |
| JP | 2009-033321 A | | 2/2009 |

OTHER PUBLICATIONS

The above reference was cited in a Mar. 19, 2013 Japanese Office Action, a copy of which is enclosed without English Translation, that issued in Japanese Patent Application No. 2009-173000.

* cited by examiner

*Primary Examiner* — Trung Diep
(74) *Attorney, Agent, or Firm* — Cowan, Liebowitz & Latman, P.C.

(57) ABSTRACT

An image pickup apparatus that make it possible to perform image processing under appropriate conditions and secure appropriate image qualities of taken images. The image pickup device has a photoelectric conversion element portion that generates signal electric charge according to the amount of received light, a first optical black unit having a light-shielded photoelectric conversion element structure and having first output characteristics, and a second optical black unit having a light-shielded photoelectric conversion element structure and having second output characteristics different from the first output characteristics. A dark current value is measured based on an output from the first optical black unit and an output from the second optical black unit. Whether or not to perform image processing is determined according to the measured dark current value.

14 Claims, 16 Drawing Sheets

WHEN AMOUNT OF DARK CURRENT IS SMALL : Null-OB1
WHEN AMOUNT OF DARK CURRENT IS LARGE : OB2-OB1

IMAGE PICKUP APPARATUS AND CONTROL METHOD THAT CORRECT IMAGE DATA TAKEN BY IMAGE PICKUP APPARATUS

BACKGROUND OF THE INVENTION

1. Field of the Invention

The present invention relates to an image pickup apparatus and a control method that correct image data taken by an image pickup device.

2. Description of the Related Art

Conventionally, it is well known that in image pickup apparatuses, when exposure is performed for a long period of time, shooting is performed at high speed, or shooting is performed at high temperature using a solid-state image pickup device (hereafter referred to as an image pickup device), dark current develops in the image pickup device.

The reason why dark current develops in the image pickup device is that the image pickup device has a property of not only converting light energy into electric signals but also converting thermal energy into electric signals. It is known that dark current is heavily dependent on temperatures, and when the temperature rises by 8° C. to 10° C., the output of dark current almost doubles. Because dark current developing in the image pickup device adversely affects image quality, various measures have been taken in terms of manufacturing so as to decrease dark current components.

Moreover, not only when the temperature of an image pickup device as a whole rises due to an installation environment in which the image pickup device is mounted in an image pickup apparatus or the like, but also when the amount of electric current consumed by a part of the image pickup device (for example, the amount of electric current consumed by an amplifier installed in an output stage is large), a phenomenon described hereafter may occur. Part of the image pickup device may increase in temperature, and dark current in only this part increases, resulting in an increase in the output of the image pickup device. For example, when exposure is performed for a long period of time in high-speed shooting using an image pickup apparatus (that is, when a night scene or the like is taken), a light of color close to magenta may appear in a region of an image taken by an image pickup device where there is no light under normal conditions.

There has been the problem that when dark current of an image pickup device increases as described above, this greatly affects image quality, and for example, in-surface brightness and color balance of the image pickup device go awry when the in-surface distribution of the dark current in the image pickup device is uneven. As a process for addressing such a problem, a noise reduction process (so-called dark image subtraction process) is known. The dark image subtraction process is a process in which after an original image as a target to be shot is taken, an image is taken (dark image) with an image pickup device shielded from light under the same conditions as those when the original image was taken, and long exposure is performed so as to cancel effects of dark current by subtracting the dark image from the original image.

However, the dark image subtraction process generally has problems described hereafter.

To reliably cancel the effects of dark current when an original image is taken, it is preferred that a dark image is obtained under the same conditions as those when taking the original image was taken. For this reason, when long exposure is performed, a dark image obtainment time period equal to the exposure time period is needed, and hence operability of an image pickup apparatus deteriorates. Moreover, when a dark image is subtracted from an original image, random noise which the original image and the dark image have is √2 times random noise which the original image has, and hence substantial degradation of image quality is unavoidable.

For this reason, a method has been proposed in which in order to dispense with the dark image subtraction process when possible when shooting conditions do not require it, dark current components are detected when an original image is taken, and when the detected dark current components are more than a predetermined amount, the image subtraction process is performed.

On the other hand, as one type of pixel abnormalities of an image pickup device, there is one called a white defect. The white defect is a pixel that appears as a white spot when an image is formed when the output of dark current is very large due to a factor such as temperature or exposure time because the amount of dark current in the pixel is abnormally larger than in other pixels.

The white defect is corrected for as described below because addresses at which white defects appear and levels of white defects differ according to image pickup devices. Specifically, addresses at which white defects appear are identified in a manufacturing step for the image pickup device, and an address and a defect level are detected and stored, and pixels having abnormal output values are extracted from a taken image, thus identifying white-defect pixels. Further, a white defect pixel is corrected for by interpolating from peripheral pixels.

As for white defects, there is the problem that conspicuous signs of correction appear in correction pixels when thin lines are shot, and hence there has been proposed that, whether or not to correct for white defects is determined according to the amount of dark current so as to dispense with unnecessary correction.

As a method to detect dark current, a technique described hereafter has been proposed (see, for example, Japanese Laid-Open Patent Publication (Kokai) No. 2007-158626). According to the technique proposed in Japanese Laid-Open Patent Publication (Kokai) No. 2007-158626, a black reference pixel region (null pixels) that does not have a photoelectrical conversion element structure and a black reference pixel region (OB (optical black) pixels) that has a photoelectrical conversion element structure but is shielded from light are disposed in a pixel region of an image pickup device. Thus, an output value of a null pixel including no unnecessary dark current can be subtracted from an output value of an OB pixels including dark current.

Also, as a technique related to the present invention, described later, a technique described hereafter has been proposed (see, for example, Japanese Laid-Open Patent Publication (Kokai) No. 2005-175930). According to the technique proposed in Japanese Laid-Open Patent Publication (Kokai) No. 2005-175930, an image pickup device has at least two regions (OB1 and OB2) having photoelectrical conversion elements of different sizes, and an OB pulse is selected by storing a relationship between shooting conditions and environmental (temperature) conditions and OB pulses in a control circuit or memory of the image pickup device in advance. Thus, output differences from an effective pixel unit are corrected for. However, there is the problem that when the temperature of the image pickup device cannot be accurately detected due to a failure in a temperature detection circuit or the like, desired results cannot be obtained if control is provided using OB pulses stored in advance.

Moreover, there has been proposed a technique to obtain output information from both an OB unit and a simulated black level pixel unit and perform predetermined image processing (black level adjustment) based on the obtained output information (see, for example, Japanese Laid-Open Patent Publication (Kokai) No. 2007-27845). According to the technique proposed in Japanese Laid-Open Patent Publication (Kokai) No. 2007-27845, a process to cope with a case where output information from both the OB unit and the simulated black level pixel unit cannot be accurately measured is not disclosed. Also, although it is described that processing contents are changed according to temperature, there is the problem that a desired process cannot be performed when an external temperature sensor fails because temperature information is obtained from the external temperature sensor.

Referring now to FIGS. 16A to 16C, a brief description will be given of an image pickup device. FIG. 16A shows an exemplary pixel arrangement of the image pickup device, which has an effective pixel unit 1001, an OB pixel unit 1002, and a null pixel unit 1003. FIG. 16B shows pixel output in a dotted line region in FIG. 16A when the amount of dark current is small and in a case where difference computation is possible (OB pixel output–null pixel output: measurable). FIG. 16C shows pixel output in the dotted line region in FIG. 16A when the amount of dark current is large and in a case where difference computation is impossible (OB pixel output–null pixel output: unmeasurable).

In general, in an image pickup apparatus having the image pickup device shown in FIGS. 16A to 16C, to prevent dark current output from compressing a computation dynamic range of a subject image during shooting, clamping is performed so that output from the OB pixel unit 1002 can be inside a predetermined output range. In this case, the predetermined output range is generally determined so as to be in a direction opposite to a light output direction in the computation dynamic range and to be inside the computation dynamic range. In the image pickup device, a dark current output direction and the light output direction are the same.

In the image pickup device shown in FIGS. 16A to 16C, when the amount of dark current is large as in shooting at high temperature, shooting at high speed, or shooting involving long exposure, output from the OB pixel unit is fixed at a clamping level irrespective of the amount of dark current, but there is a great difference in output between the OB pixel unit and the null pixel unit. In the example shown in FIG. 16C, because output from the null pixel unit exceeds the computation dynamic range, differences in output between the OB pixel unit and the null pixel unit cannot be accurately measured. Also, due to a large amount of dark current, a dark current value cannot be accurately obtained. Thus, there is the problem that the dark image subtraction process and the white defect correction process cannot be performed under desired dark current conditions.

SUMMARY OF THE INVENTION

The present invention provides an image pickup apparatus and a control method that make it possible to perform image processing under appropriate conditions and secure appropriate image qualities of taken images.

Accordingly, in a first aspect of the present invention, there is provided an image pickup apparatus comprising an image pickup device comprising a photoelectric conversion element unit that generates signal electric charges according to an amount of received light, a first optical black unit having a light-shielded photoelectric conversion element structure and having first output characteristics, and a second optical black unit having a light-shielded photoelectric conversion element structure and having second output characteristics different from the first output characteristics, a measurement unit adapted to measure a dark current value of the image pickup device based on an output from the first optical black unit and an output from the second optical black unit, and a determination unit adapted to determine whether to perform image processing according to the dark current value measured by the measurement unit.

Accordingly, in a second aspect of the present invention, there is provided an image pickup apparatus comprising an image pickup device comprising a photoelectric conversion element unit that generates signal electric charges according to an amount of received light, a first optical black unit having a light-shielded photoelectric conversion element structure, and a second optical black unit having a light-shielded photoelectric conversion element structure, a measurement unit adapted to measure a dark current value of the image pickup device based on an output from the first optical black unit and an output from the second optical black unit, and a determination unit adapted to determine whether to perform image processing according to the dark current value measured by the measurement unit, wherein a photoelectric conversion element area of the second optical black unit is larger than a photoelectric conversion element area of the first optical black unit.

Accordingly, in a third aspect of the present invention, there is provided a control method for an image pickup apparatus that takes images using an image pickup device comprising a photoelectric conversion element unit that generates signal electric charges according to an amount of received light, a first optical black unit having a light-shielded photoelectric conversion element structure and having first output characteristics, and a second optical black unit having a light-shielded photoelectric conversion element structure and having second output characteristics different from the first output characteristics, comprising a measurement step of measuring a dark current value of the image pickup device based on an output from the first optical black unit and an output from the second optical black unit, and a determination step of determining whether to perform image processing according to the dark current value measured in the measurement step.

Accordingly, in a fourth aspect of the present invention, there is provided a control method for an image pickup apparatus that takes images using an image pickup device comprising a photoelectric conversion element unit that generates signal electric charges according to an amount of received light, a first optical black unit having a light-shielded photoelectric conversion element structure, and a second optical black unit having a light-shielded photoelectric conversion element structure, comprising a measurement step of measuring a dark current value of the image pickup device based on an output from the first optical black unit and an output from the second optical black unit, and a determination step of determining whether to perform image processing according to the dark current value measured in the measurement step, wherein a photoelectric conversion element area of the second optical black unit is larger than a photoelectric conversion element area of the first optical black unit.

According to the present invention, because an accurate amount of dark current (dark current value) can be measured when image processing (dark image subtracting process and white defect correction process) is performed in the image pickup apparatus, the image processing can be performed under appropriate conditions. As a result, appropriate image qualities of images picked up by the image pickup device can be secured.

Further features of the present invention will become apparent from the following description of exemplary embodiments (with reference to the attached drawings).

BRIEF DESCRIPTION OF THE DRAWINGS

FIGS. 1A and 1B are diagrams useful in explaining an image pickup device according to a first embodiment of the present invention, in which FIG. 1A shows an exemplary pixel arrangement, and FIG. 1B shows pixel output in a dotted line region in FIG. 1A.

FIGS. 16A to 16C are diagrams useful in explaining an image pickup device according to a prior art, in which FIG. 16A shows an exemplary pixel arrangement, FIG. 16B shows pixel output in a dotted line region in FIG. 16A when the amount of dark current is small, and FIG. 16C shows pixel output in the dotted line region in FIG. 16A when the amount of dark current is large.

DESCRIPTION OF THE EMBODIMENTS

The present invention will now be described in detail with reference to the drawings showing embodiments thereof.

Figure 1A:
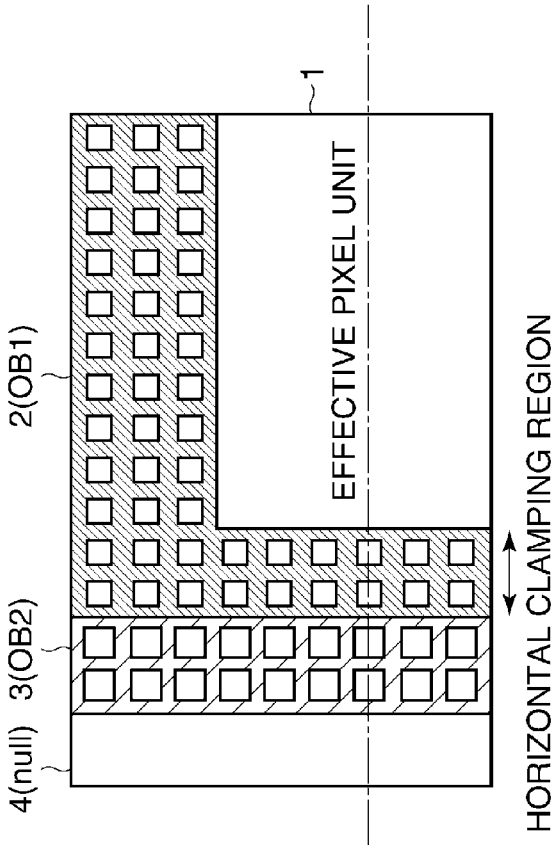
Figure 1B:
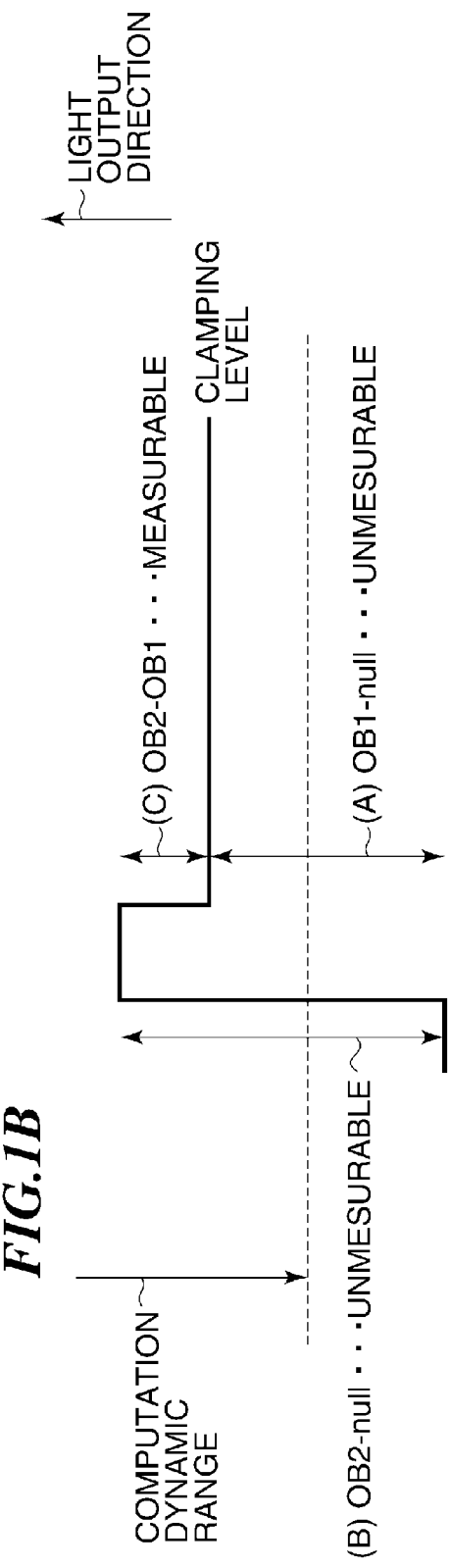

FIGS. 1A and 1B are diagrams useful in explaining an image pickup device according to a first embodiment of the present invention, in which FIG. 1A shows an exemplary pixel arrangement, and FIG. 1B shows pixel output in a dotted line region in FIG. 1A.

Referring to FIG. 1A, the image pickup device has an effective pixel unit 1, a first black reference pixel region (hereafter referred to as the OB1 pixel unit) 2, a second black reference pixel region (hereafter referred to as the OB2 pixel unit) 3, and a black reference pixel region (hereafter referred to as the null pixel unit) 4. It should be noted that in the present embodiment, in only the OB1 pixel unit 2 and the OB2 pixel unit 3, portions corresponding to pixels are expressed by squares so as to simplify the figures. Moreover, it is assumed that the entire image pickup device is shielded from light, and the amount of dark current is large. Also, it is assumed that outputs in the OB1 pixel unit 2 are clamped at a predetermined level.

The effective pixel unit 1 (photoelectrical conversion element unit) is a pixel region that is not shielded from light and has a photoelectrical conversion element structure that generates signal electric charge corresponding to the amount of received light. The OB1 pixel unit 2 (first optical black unit) is a region that is shielded from light and has a photoelectrical conversion element structure. The OB2 pixel unit 3 (second optical black unit) is a region that is shielded from light, has a photoelectrical conversion element structure, and differs in pixel size from the OB1 pixel unit 2. The null pixel unit 4 (simulated black reference pixel unit) is a region that does not have a photoelectrical conversion element structure.

The OB pixel unit 2 that has pixels of the same size as that of pixels of the effective pixel unit 1 and is shielded from light is disposed on an upper side and a left side of the effective pixel unit 1. Further, on a left side of the OB1 pixel unit 2 is disposed the OB2 pixel unit 3 that has pixels of which size is 1.5 times larger than the pixel size of the OB1 pixel unit 2, and is shielded from light is disposed. Namely, a photoelectrical conversion element area of the OB2 pixel unit 3 is set to be larger than that of the OB1 pixel unit 2. Further, the null pixel unit 4 is disposed on a left side of the OB2 pixel unit 3.

Referring to FIG. 1B, the null pixel unit 4 has a low output level because there is no dark current. The OB2 pixel unit 3 has a very high output level because there is a large amount of dark current due to a large pixel size (second output characteristics). The OB1 pixel unit 2 and the effective pixel unit 1 have the same pixel size, which is smaller than the pixel size of the OB2 pixel unit 3, and hence the OB1 pixel unit 2 has a lower output level than that of the OB2 pixel unit 3 (first output characteristics). Similarly, the effective pixel unit 1 has a lower output level than that of the OB2 pixel unit 3. Because an output from the OB1 pixel unit 2 is clamped to a predetermined level, an output from the null pixel unit 4 is at a level below a computation dynamic range.

In the present embodiment, it is arranged such that an output from the OB1 pixel unit 2 of the image pickup device serves as a black reference. A region indicated by a horizontal arrow in the figure in the OB1 pixel unit 2 of the image pickup device is a horizontal OB clamping region. It should be noted that in the following description, "output from the OB1 pixel unit 2" will be referred to as "OB1 pixel output", "output from the OB2 pixel unit 3" will be referred to as "OB2 pixel output", and "output from the null pixel unit 4" will be referred to as "null pixel output" as appropriate.

As shown in the figure, it is impossible to measure the value of dark current based on (A) "OB1 pixel output−null pixel output" and (B) "OB2 pixel output−null pixel output". Primarily, (A) "OB1 pixel output−null pixel output" is desired to be measured as the amount of dark current (dark current value).

Here, a difference between OB1 pixel output and null pixel output and a difference between OB2 pixel output and null pixel output correspond to only the amount of dark current. Moreover, dark current is proportional to pixel size. Further, the ratio between the pixel size of the OB1 pixel unit 2 and the pixel size of the OB2 pixel unit 3 is 1:1.5. Thus, a pixel output state is expressed by the following formula (1). By measuring (C) "OB2 pixel output−OB1 pixel output", (A) "OB1 pixel output−null pixel output" can be obtained.

$$(OB1\ pixel\ output - null\ pixel\ output) = 2 \times (OB2\ pixel\ output - OB1\ pixel\ output) \qquad (1)$$

It should be noted that in FIGS. 1A and 1B, the OB1 pixel unit, the OB2 pixel unit, and the effective pixel unit are arranged as pixels of the image pickup device, the present invention is not limited to this. Null pixels are not always needed because (A) OB1 pixel output-null pixel output can be obtained based on the above formula (1).

Figure 2:
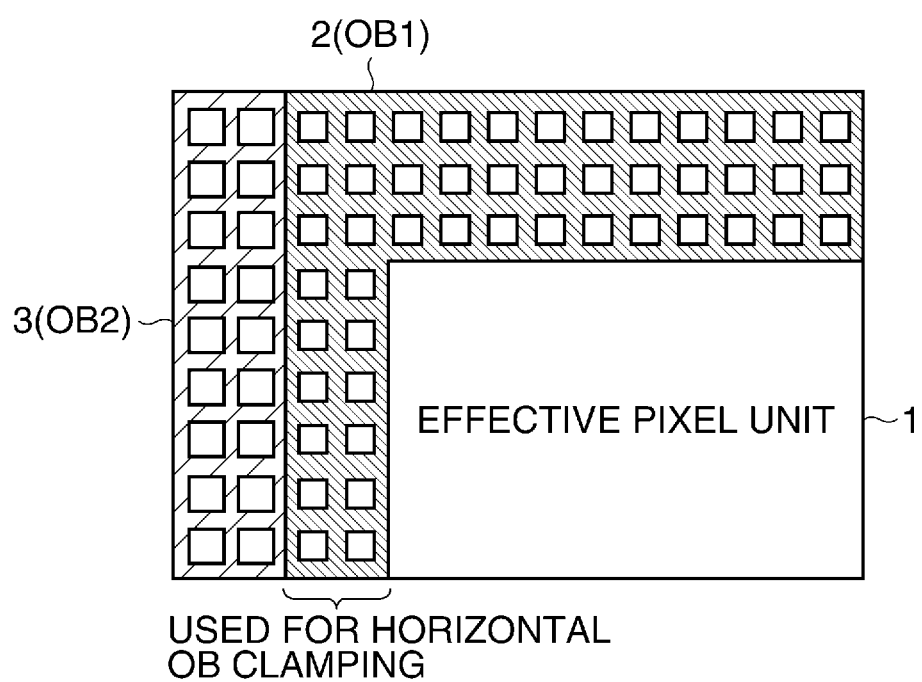
FIG. 2 is a diagram showing an exemplary pixel arrangement in a case where the image pickup device has no null pixel.

FIG. 2 is a diagram showing an exemplary pixel arrangement in a case where the image pickup device has no null pixel.

Referring to FIG. 2, the image pickup device has the effective pixel unit 1, the OB1 pixel unit 2, and the OB2 pixel unit 3. The OB1 pixel unit 2 that has pixels of the same size as that of pixels of the effective pixel unit 1 and is shielded from light is disposed on an upper side and a left side of the effective pixel unit 1. Further, the OB2 pixel unit 3 of which pixel size is 1.5 times larger than that of pixels of the OB1 pixel unit 2 and is shielded from light is disposed on a left side of the OB1 pixel unit 2. Namely, the image pickup device in FIG. 2 is the same as the image pickup device in FIG. 1 except that it has no null pixel.

Figure 3:
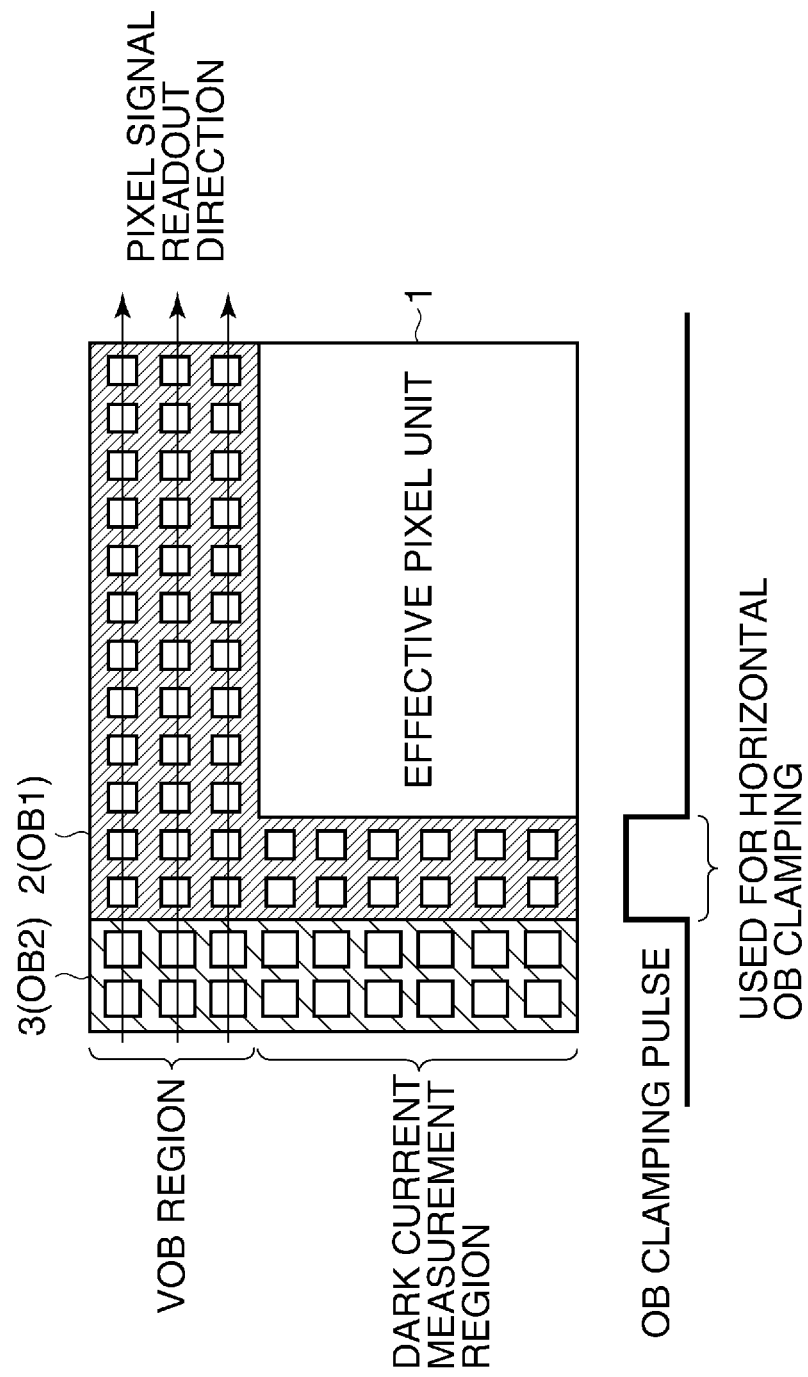
FIG. 3 is a diagram useful in explaining how pixel signals are read out in the pixel arrangement of the image pickup device in FIG. 2.

FIG. 3 is a diagram useful in explaining how pixel signals are read out in the pixel arrangement of the image pickup device in FIG. 2.

Referring to FIG. 3, pixel signals of the image pickup device are sequentially read out in directions indicated by arrows from the upper left pixel as viewed in the figure, and they are subjected to clamping by an OB clamping pulse so that OB1 pixel output on the left side of the effective pixel unit 1 can be at a predetermined level. Also, OB1 pixels and OB2 pixels above the effective pixel unit 1, which are regarded as a VOB (vertical optical black) region, are used for clamping, and OB1 pixels and OB2 pixels below the VOB region are regarded as a dark current measurement region. As described later, a dark current value is measured by obtaining a difference between OB2 pixel output and OB1 pixel output in the dark current measurement region, and whether or not to perform image processing (a white defect correction process and a dark image subtraction process) is determined according to the dark current value.

Figure 4:
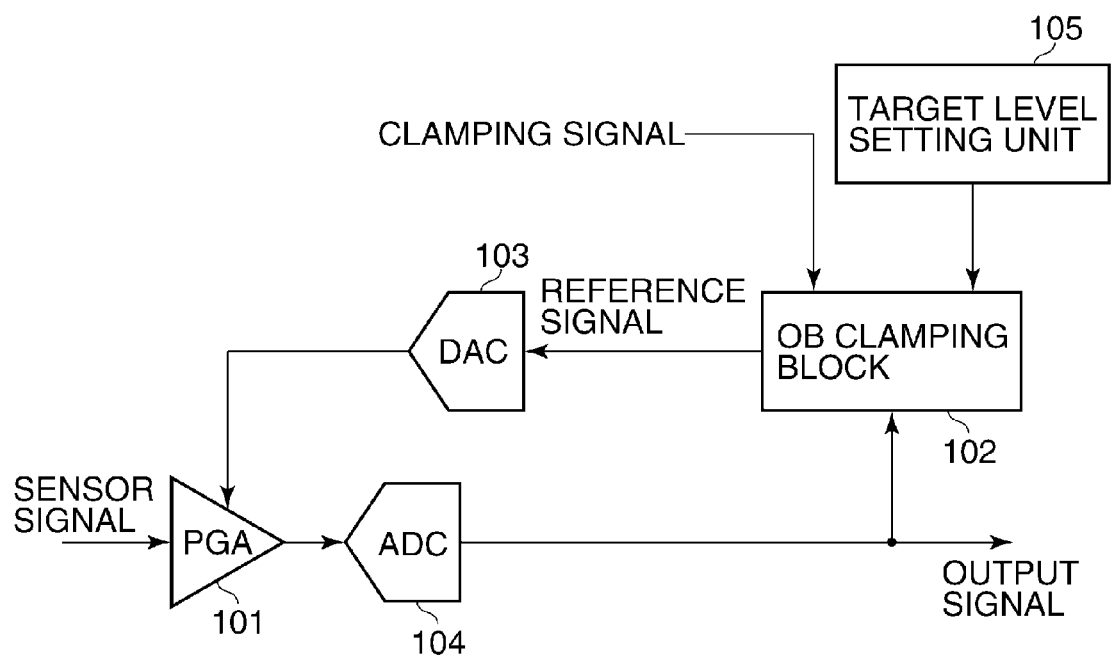
FIG. 4 is a block diagram schematically showing an arrangement of a signal processing circuit that processes signals output from the image pickup device of an image pickup apparatus.

FIG. 4 is a block diagram schematically showing an arrangement of a signal processing circuit that processes signals output from the image pickup device of the image pickup apparatus.

Referring to FIG. 4, the signal processing circuit is comprised of a programmable gain amplifier (PGA) 101, an OB clamping block 102, a digital-to-analog converter (DAC) 103, an analog-to-digital converter (ADC) 104, and a target level setting unit 105. An arrangement of an essential part of the image pickup apparatus including the signal processing circuit will be described later with reference to FIG. 5.

A description will now be given of functions of the above component elements and an OB clamping operation. The PGA 101 amplifies a pixel signal (sensor signal) output from the image pickup device, and outputs the same to the ADC 104. The ADC 104 converts the output signal (amplified sensor signal) from the PGA 101 from analog to digital form, and outputs the same to the OB clamping block 102 and a DSP (FIG. 5), described later. The target level setting unit 105 inputs a clamping target value to the OB clamping block 102. In this case, the clamping target value may be arbitrarily determined.

The OB clamping block 102 generates a reference signal in such a direction that a difference between the clamping target value input from the target level setting unit 105 and the output signal input from the ADV 104 can be zero. Namely, the OB clamping block 102 generates a reference signal that causes an output signal from the OB1 pixel unit 2 of the image pickup device to become closer to the clamping target value by a value obtained by multiplying the difference by a predetermined gain (one quarter to one half in the case of high-speed clamping and one sixty-fourth to one thirty-second in the case of low-speed clamping). This operation is performed while a clamping signal is input to the OB clamping block 102 from a clamping signal supply unit, not shown.

The OB clamping block 102 outputs the reference signal in digital form to the DAC 103. The DAC 103 converts the reference signal generated by the OB clamping block 102 from digital to analog form, and outputs the reference signal subjected to the conversion to the PGA 101. Thus, a reference voltage for sensor signals input from the image pickup device to the PGA 101 is determined.

As described above, sensor signals output from the image pickup device having the pixel arrangement shown in FIG. 3 are subjected to OB clamping by the signal processing circuit arranged as shown in FIG. 4. In this case, in order that OB pixels can converge on a predetermined level at high speed even when a large amount of dark current is produced in the image pickup device, a high-speed clamping operation is performed in the VOB region of the image pickup device, and a low-speed clamping operation is performed after completion of the high-speed clamping operation in the VOB region. Thus, OB clamping can be performed in an appropriate manner.

Figure 5:
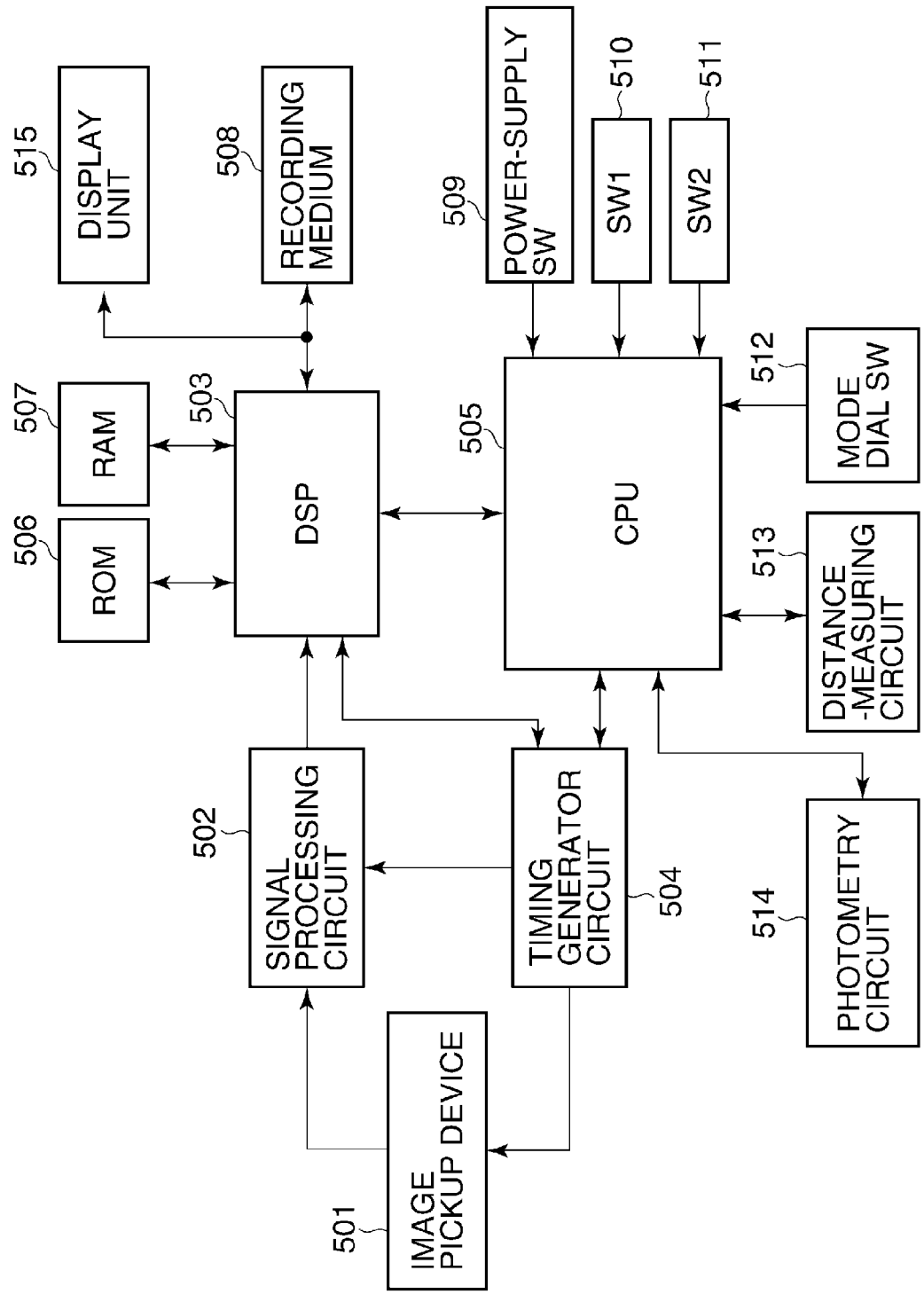
FIG. 5 is a block diagram schematically showing an arrangement of an essential part of the image pickup apparatus.

FIG. 5 is a block diagram schematically showing an arrangement of an essential part of the image pickup apparatus according to the present embodiment.

Referring to FIG. 5, the image pickup apparatus is configured as a digital camera. The image pickup apparatus has an image pickup device 501, a signal processing circuit 502, a DSP (digital signal processor) 503, a timing generator circuit (TG: timing generator) 504, a CPU 505, a ROM 506, and a RAM 507. Further, the image pickup apparatus has a power-supply switch 509, a first shutter switch (SW1) 510, a second shutter switch (SW2) 511, a mode dial switch 512, a distance-measuring circuit 513, a photometric circuit 514, and a display unit 515.

Specifically, the image pickup device 501 is comprised of a CCD sensor or a CMOS sensor, and performs photoelectrical conversion of an optical image of a subject, which is a target to be shot, into pixel signals (sensor signals). The signal processing circuit 502, which is a circuit that amplifies sensor signals output from the image pickup device 501 and performs OB clamping or the like on them as described above, receives OB clamping timing, OB clamping target level, and so on from the timing generator circuit 504, and operates in accordance with them.

The DSP 503 performs various types of correction processes (a process in which one-dimensional correction values for correcting horizontal shading caused by a readout circuit of the image pickup device are stored in advance and subtracted from signals) or the like on data output from the signal processing circuit 502. The DSP 503 also controls various types of memory (the ROM 506 and the RAM 507), and performs a process to write image data (video data) in a recording medium 508. The timing generator circuit 504, which is a circuit that supplies clock signals and control signals to the image pickup device 501, the signal processing circuit 502, and the DSP 503, is controlled by the CPU 505. The OB clamping pulse shown in FIG. 3 is output from the TG 504 to the signal processing circuit 502.

The CPU 505 controls the DSP 503 and the TG 504, and controls image pickup apparatus (camera) functions using the distance-measuring circuit 513, the photometric circuit 514, and so on. Further, to the CPU 505 is connected the power-supply switch 509, the first shutter switch (SW1) 510, the second shutter switch (SW2) 511, and the mode dial switch 512, and the CPU 505 performs processes according to states of the respective switches. Also, the CPU 505 performs processes (measurement of the amount of dark current in the image pickup device, determination as to whether or not to perform the white defect correction process) in a flowchart of FIG. 6 in accordance with control programs.

The ROM 506 stores control programs for the image pickup apparatus, correction tables, and so on. The RAM 507 temporarily stores image data and correction data to be processed by the DSP 503, and is capable of being accessed at higher speed than the RAM 506. The recording medium 508 (for example, a compact flash (registered trademark) card (hereafter referred to as "CF")) stores image data taken by the image pickup apparatus, and is connected to the image pickup apparatus via a connector, not shown.

The power-supply switch 509 operates in starting the image pickup apparatus. The first shutter switch (SW1) 510 operates in giving an instruction to start shooting preparing operations such as a photometric process, a distance-measuring process, and a so-called EVF operation in which a subject image is externally displayed in real time. The second shutter switch (SW2) 511 operates in giving an instruction to start a series of shooting operations in which a mirror and a shutter, not shown, are driven, and pixel signals read out from the image pickup device 501 are written into the recording medium 508 via the signal processing circuit 502 and the DSP 503.

The mode dial switch 512 operates in giving an instruction to designate a shooting mode of the image pickup apparatus (for example, a continuous shooting mode, a single shooting mode, or a strobe emission mode). The distance-measuring circuit 513 measures the distance to a subject which is a target to be shot. The photometric circuit 514 measures subject brightness. The display unit 515 displays image data (video data) taken by the image pickup apparatus.

Next, a description will be given of dark current value measurement and image processing in the image pickup apparatus according to the present embodiment arranged as described above.

Figure 6:
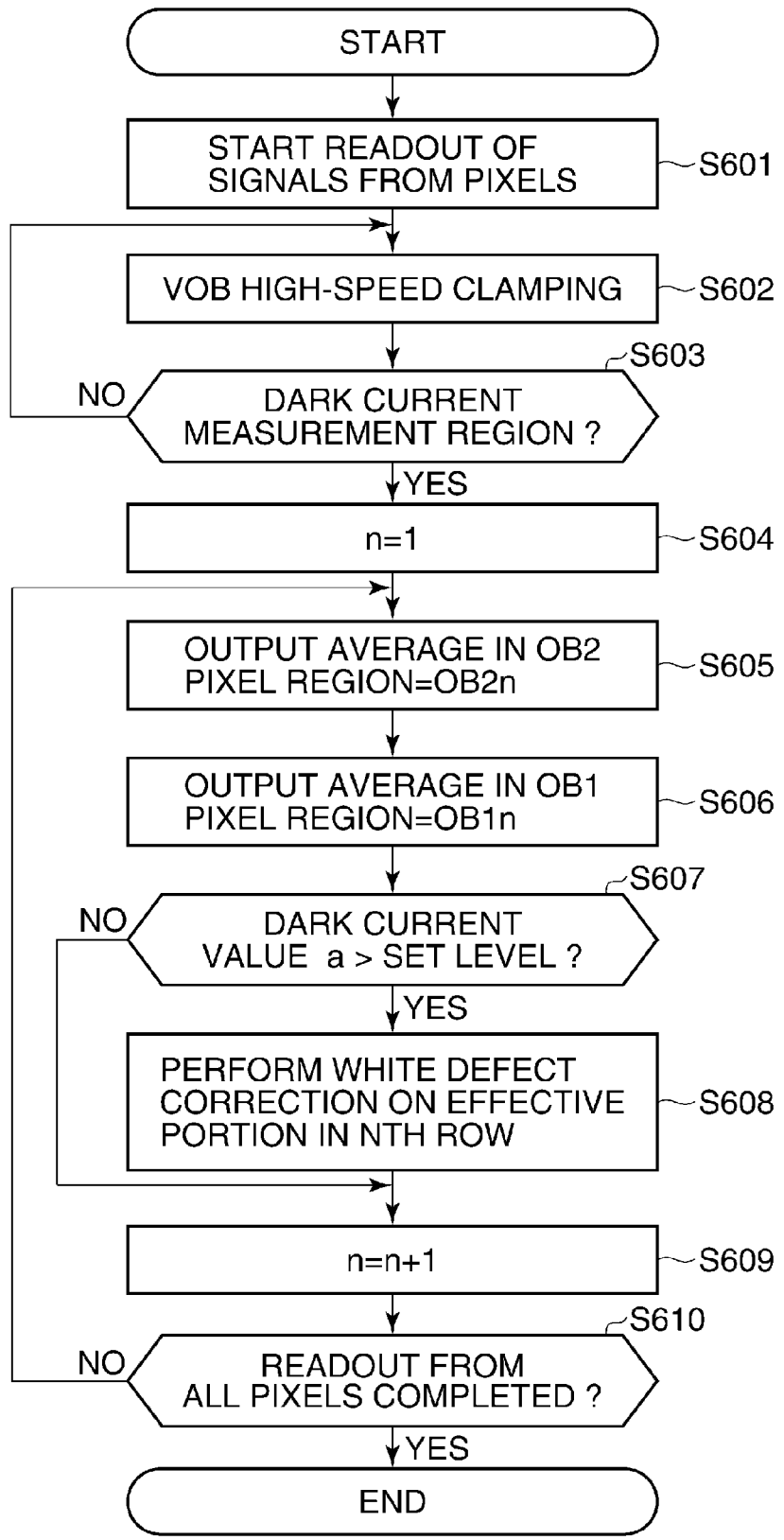
FIG. 6 is a flowchart of a process in which dark current values are measured with respect to each pixel row while pixel signals are out read from the image pickup device in the image pickup apparatus.

FIG. 6 is a flowchart of a process in which dark current values are measured with respect to each pixel row while pixel signals are read out from the image pickup device in the image pickup apparatus.

Referring to FIG. 6, after starting readout of pixel signals from respective pixels of the image pickup device 501 (step S601), the CPU 505 of the image pickup apparatus reads out pixel signals in the VOB region (see FIG. 3) and performs high-speed clamping using output from the OB1 pixel region (step S602). Then, the CPU 505 determines whether or not a pixel row being currently read out from the image pickup device 501 has reached the dark current measurement region (see FIG. 3) (step S603). When the pixel row being currently read out from the image pickup device 501 is still in the VOB region, the CPU 505 returns to the step S602 wherein it performs high-speed clamping in the VOB region.

When the pixel row being currently read out from the image pickup device 501 has reached the dark current measurement region, the CPU 505 resets a readout pixel row counter n, which counts readout pixel rows, by setting n to 1 (step S604). Then, the CPU 505 reads out pixels from the OB2 pixel region in the nth row and performs an averaging process on them at the same time, and outputs a value obtained by the averaging process as OB2n (OB2 pixel output) (step S605). Further, the CPU 505 reads out pixels from the OB1 pixel region in the nth row and performs an averaging process on them at the same time, and outputs a value obtained by the averaging process as OB1n (OB1 pixel output) (step S606).

Then, the CPU 505 substitutes OB2n-OB1n, which is a difference between OB2n and OB1n, into the above formula (1) to obtain a dark current value in the nth row (dark current value a), and determines whether or not the obtained dark current value a in the nth row is greater than a set level determined in advance (step S607). When the dark current value a is greater than the set level, the CPU 505 determines that correction should be performed because there are many white defects due to a large amount of dark current, and performs a process to correct for white defects in the effective pixel region in the nth row of the image pickup device 501 (step S608), and proceeds to step S609. When the dark current value a is not greater than the set level, the CPU 505 determines that there are only few white defects due to a small amount of dark current, and proceeds to the step S609 without performing a process to correct for white defects in the effective pixel region in the nth row.

Then, the CPU 505 increments the readout pixel row counter n, which was reset in the step S604, by 1 (n+1) (step S609). Then, by determining a count value of the readout pixel row counter n, the CPU 505 determines whether or not readout of pixels in all the pixel rows of the image pickup device 501 has been completed (step S610). When readout of pixels in all the pixel rows of the image pickup device 501 has not been completed yet, the CPU 505 returns to the step S605 wherein it repeatedly performs the processing from the step S605 through the step S610 until readout of pixels in all the pixel rows is completed. In this way, with respect to each pixel row, a dark current value is measured to determine whether or not to correct for white defects, and when readout of pixels in all the pixel rows has been completed, the present process is terminated.

As described above, by measuring a dark current value with respect to each pixel row while reading out pixel signals from the image pickup device, the conventional problem that dark current values cannot be measured due to a large amount of dark current can be solved. As a result, whether or not it is necessary to perform the white defect correction process can be determined in an appropriate manner.

Whether or not to perform the dark image subtraction process (the process in which a dark image is subtracted from an original image taken by the image pickup device so as to remove effects of dark current) and the white defect correction process (the process in which white spots appearing in an image taken by the image pickup device are corrected for) may be determined in manners described below. It should be noted that a dark image is an image that is taken with the image pickup device being shielded from light under the same conditions as those when an original image is taken.

First, after all the pixels of the image pickup device 501 are read out, average values in the OB2 pixel region and the OB1 pixel region in the dark current measurement region of image data stored in the RAM 507 are calculated and substituted as OB2 and OB1, respectively, into the above formula (1), and a result of the substitution is obtained as the amount of dark current in an image. Whether or not to perform the dark image subtraction process (noise reduction process) is determined according to the obtained amount of dark current in the image. Namely, when the amount of dark current is greater than the set level, the dark image subtraction process is performed on the obtained image, and when the amount of dark current is not greater than the set level, the dark image subtraction process is not performed on the obtained image.

Similarly, whether or not to perform the white defect correction process may also be determined based on image data stored in the RAM 507.

The amount of dark current can be easily measured as described below. When OB1 pixels of the image pickup device are to be clamped, if the size of an OB2 pixel is made smaller than that of an OB1 pixel, OB2 pixel output as well as null pixel output is outside the computation dynamic range when the amount of dark current further increases. Namely, as shown in FIG. 3, by making the size of an OB pixel unused for clamping (OB2 pixel in the example shown in FIG. 3) larger than that of an OB pixel used for clamping (OB1 pixel in the example shown in FIG. 3), OB2 pixel output can be made greater than OB1 pixel output. Thus, the amount of dark current can be easily measured.

It should be noted that although in the present embodiment, only whether or not to perform the white defect correction process is determined according to the amount of dark current, the present invention is not limited to this. There are many types of white defects ranging in output from relatively high to relatively low. It may be arranged such that output levels of white defects and addresses of white defects on an image are stored in advance, and when the amount of dark current is small, white defects with relatively high output are corrected for, and when the amount of dark current is large, not only white defects with relatively high output but also white defects with relatively low output are corrected for.

Next, a description will be given of a first variation and a second variation of the present embodiment.

Figure 7:
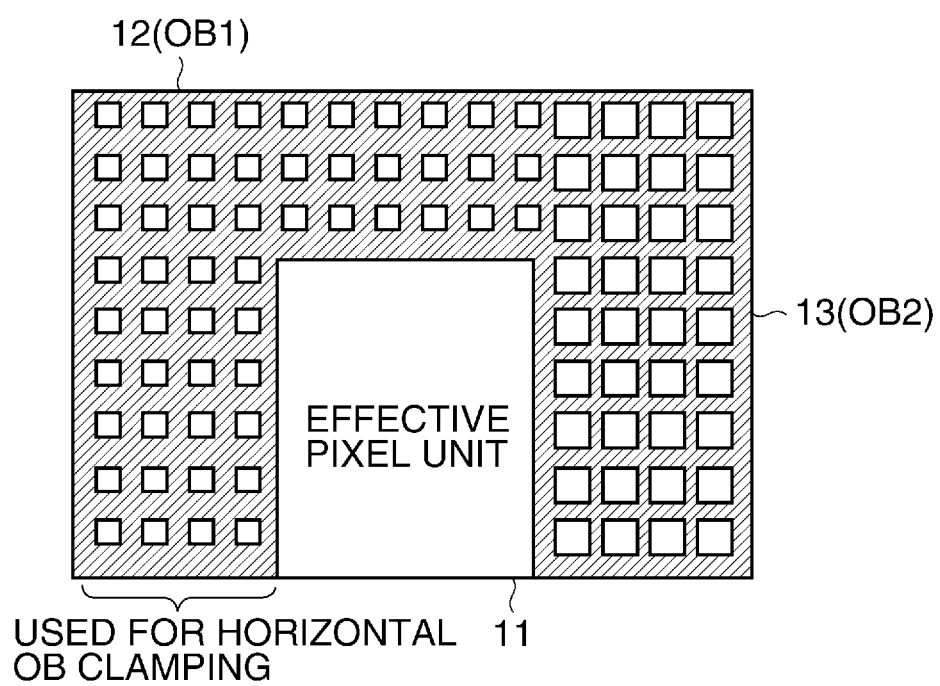
FIG. 7 is a diagram showing an exemplary pixel arrangement of an image pickup device according to a first variation.

FIG. 7 is a diagram showing an exemplary pixel arrangement of an image pickup device according to the first variation.

Referring to FIG. 7, the image pickup device has an effective pixel unit 11, an OB1 pixel unit 12, and an OB2 pixel unit 13. The OB1 pixel unit 12, which is shielded from light, is disposed on a left side and an upper side of the effective pixel unit 11. The light-shielded OB2 pixel unit 13, of which pixel size is greater than that of the OB1 pixel unit 12, is disposed on a right side of the effective pixel unit 11. In this case as well, horizontal OB clamping is performed using OB1 pixels, and OB2 pixels are used to measure the amount of dark current.

Figure 8:
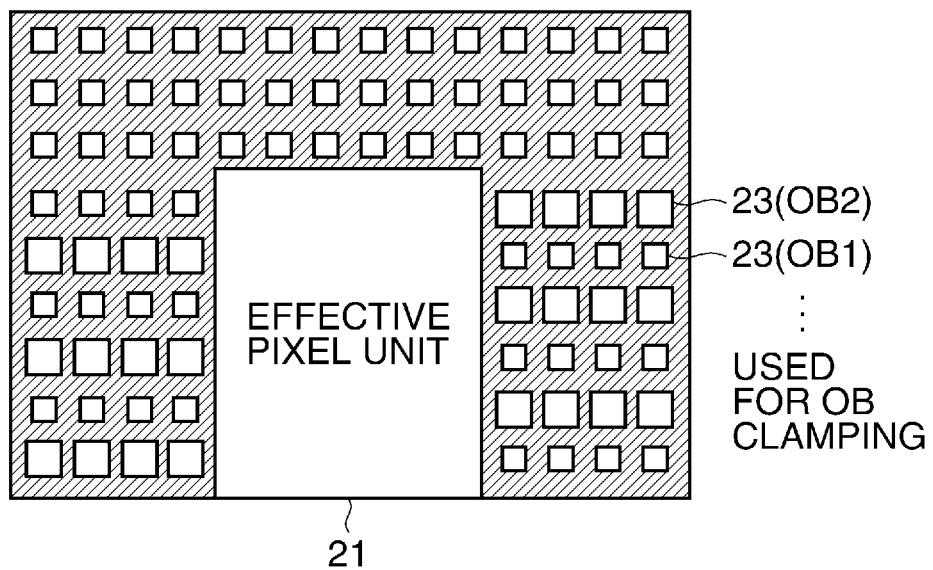
FIG. 8 is a diagram showing an exemplary pixel arrangement of an image pickup device according to a second variation.

FIG. 8 is a diagram showing an exemplary pixel arrangement of an image pickup device according to the second variation.

Referring to FIG. 8, the image pickup device has an effective pixel unit 21, an OB1 pixel unit 22, and an OB2 pixel unit 23. On a left side of the effective pixel region 21, the OB1 pixel unit 22 and the OB2 pixel unit 23 are arranged alternately every other line. On a right side of the effective pixel region 21, the OB1 pixel unit 22 and the OB2 pixel unit 23 are arranged alternately every other line. Namely, right and left OB pixels have different sizes in each row. Similarly to the first variation, OB clamping is performed using OB1 pixels, and OB2 pixels are used to measure the amount of dark current.

As described in detail, according to the present embodiment, because the amount of dark current can be accurately measured in performing the dark image subtraction process and the white defect correction process in the image pickup apparatus, the dark image subtraction process and the white defect correction process can be performed under appropriate dark current conditions. As a result, appropriate image qualities of images taken by the image pickup device can be secured.

A second embodiment of the present invention differs from the above described first embodiment in points described below. Other elements of the present embodiment are the same as the corresponding ones of the above described first embodiment, and therefore, description thereof is omitted.

Figure 9:
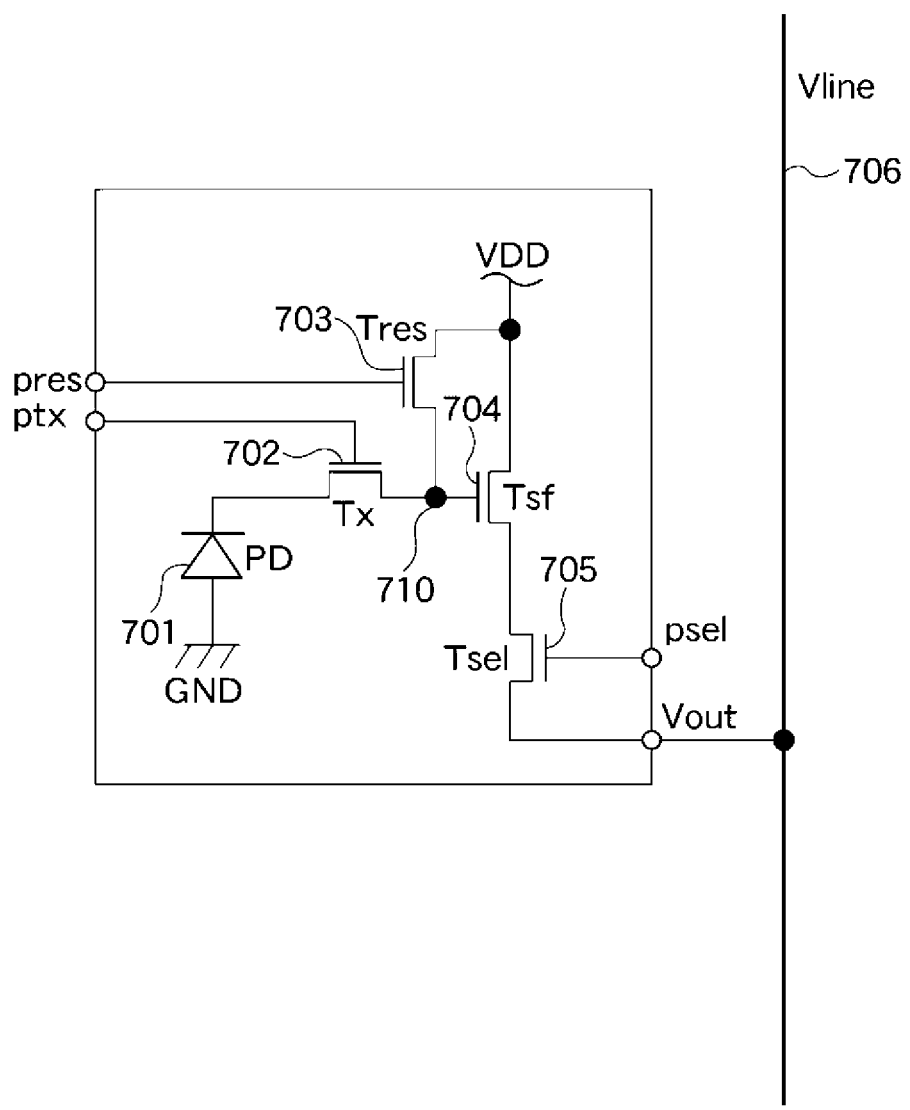
FIG. 9 is a diagram schematically showing an arrangement of a typical pixel cell of an image pickup device according to a second embodiment of the present invention.

FIG. 9 is a diagram schematically showing an arrangement of a typical pixel cell Pixel of a CMOS-type image pickup device according to the present embodiment.

Referring to FIG. 9, an OB2 pixel unit (second optical black unit) constituting the image pickup device is arranged such that an output from one photoelectric conversion element (701) is transferred to one floating diffusion (connection point) 710 and read out. A detailed description thereof will be given below.

The photodiode (PD) 701 is a diode that produces optical signal electric charge, and has an anode thereof grounded. A cathode of the photodiode (PD) 701 is connected to a gate of an amplification MOS transistor (Tsf) 704 via a transfer MOS transistor (Tx) 702.

Moreover, a source of a reset MOS transistor (Tres) 703 for resetting the amplification MOS transistor (Tsf) 704 is connected to the gate of the amplifying MOS transistor (Tsf) 704. A drain of the reset MOS transistor (Tres) 703 is connected to a power-supply voltage VDD.

Further, the amplification MOS transistor (Tsf) 704 has a drain thereof connected to the power-supply voltage VDD, and has a source thereof connected to a drain of a selection MOS transistor (Tsel) 705. Moreover, a source of the selection MOS transistor (Tsel) 705 is connected to a vertical output line (Vline) 706 commonly used in the same column. With this arrangement, pixels of the image pickup device are output.

Figure 10:
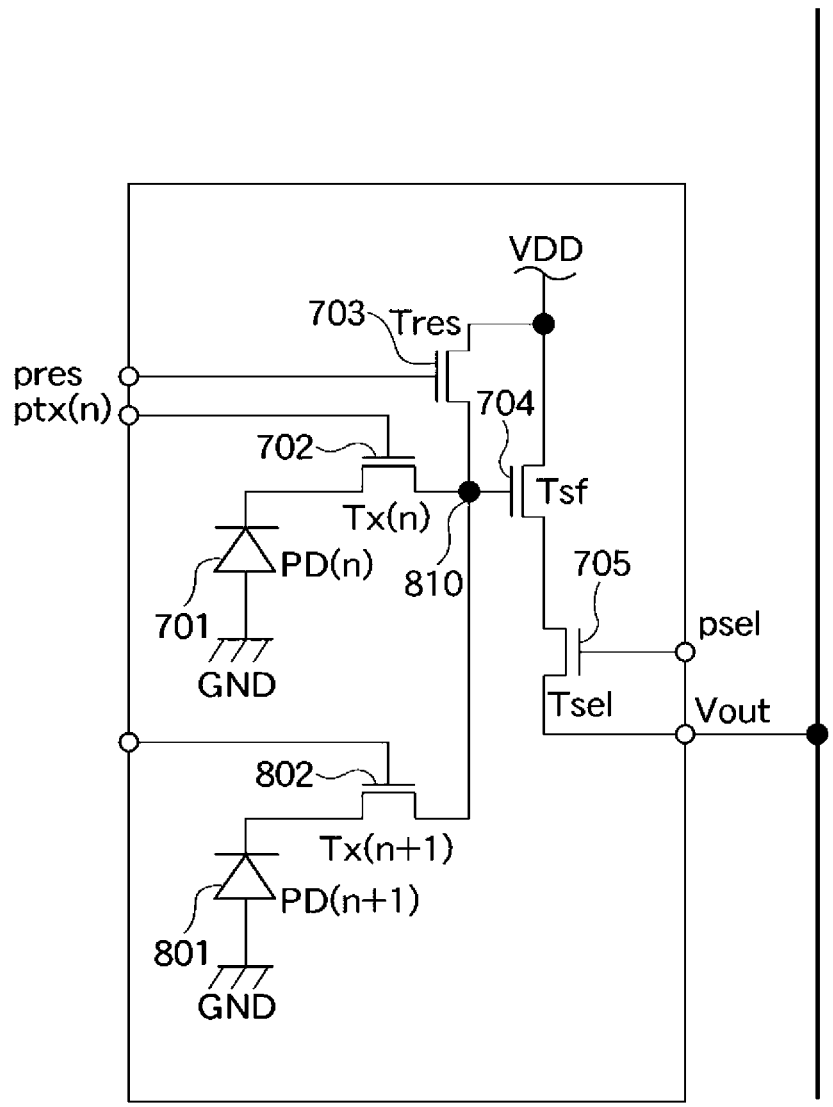
FIG. 10 is a diagram schematically showing an arrangement of a pixel cell in a case where transistors constituting pixels of the image pickup device are commonly used.

On the other hand, with increase in pixels of image pickup devices in recent years, an image pickup device having an arrangement that transistors constituting pixels of the image pickup device are commonly used is emerging. This arrangement is shown in FIG. 10. FIG. 10 is a diagram schematically showing an arrangement of a pixel cell in a case where transistors constituting pixels of the image pickup device are commonly used. In the present embodiment, the pixel cell shown in FIG. 10 is disposed in the OB1 pixel unit (the first optical black unit) constituting the image pickup device. Namely, it is arranged such that outputs from a plurality of photoelectric conversion elements (701 and 801), which are adjacent to each other, to one floating diffusion 810 via switch units (702 and 802) and read out. A detailed description will be given below.

The photodiode (PD (n)) 701 is disposed as a pixel in the nth row of the image pickup device. The transfer MOS transistor (Tx(n)) 702 is in the nth row. The reset transistor (Tres) 703 through the selection MOS transistor (Tsel) 705 are the same as those in FIG. 9, and therefore, description thereof is omitted.

The photodiode (PD (n+1)) 801 is disposed as a pixel in the n+1th row of the image pickup device. The transfer MOS transistor (Tx (n+1)) 802 is in the n+1th row. Namely, the image pickup device has photodiodes (PD), which produce optical signal electric charge, and transfer MOS transistors (Tx) for individual use, but have other components (MOS transistors) commonly used. This realizes an increase in the number of pixels while preventing a decrease in photodiode area.

Incidentally, to realize an increase in the number of pixels while preventing a decrease in photodiode area, the OB1 pixel unit and the effective pixel unit for use clamping must be arranged as shown in FIG. 10, but the OB2 pixel unit intended for measurement of dark current values does not have to be arranged as shown in FIG. 10. Namely, the amount of dark current is expected to vary a little between adjacent rows, and hence the OB2 pixel unit is arranged such that one photodiode has an area equivalent to two rows. This arrangement is shown in FIG. 11.

Figure 11:
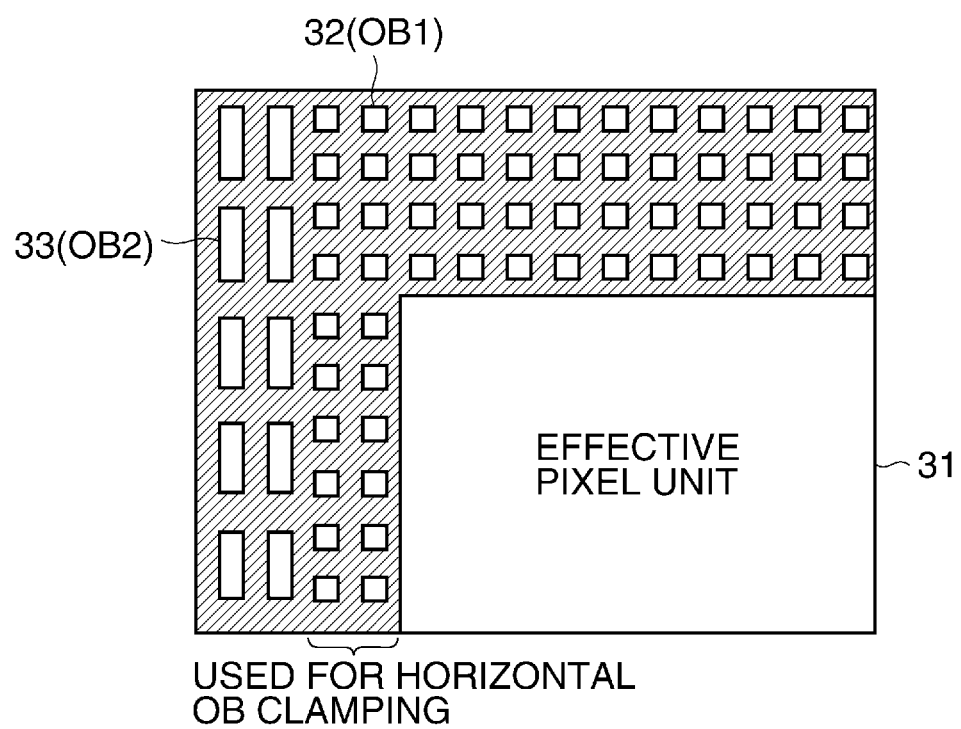
FIG. 11 is a diagram showing an exemplary pixel arrangement of the image pickup device.

FIG. 11 is a diagram showing an exemplary pixel arrangement of the image pickup device.

Referring to FIG. 11, the image pickup device has an effective pixel unit 31, an OB1 pixel unit 32, and an OB2 pixel unit 33. The OB1 pixel unit 32 is disposed on a left side and an upper side of the effective pixel unit 31. The OB2 pixel unit 33 is disposed on a left side of the OB1 pixel unit 32. In the OB1 pixel unit 32 and the effective pixel unit 31, two pixels in a vertical direction commonly use a MOS transistor. The pixel size of the OB2 pixel unit 33 is twice the pixel size of the OB1 pixel unit 32.

For example, dark current in the nth row may be obtained from OB2 (n, n+1) pixel output−OB1 (n) pixel output, and dark current in the n+1th row may be obtained from OB2 (n, n+1) pixel output−OB1 (n+1) pixel output.

The pixel arrangement of the image pickup device will be described in further detail. The pixel arrangement in the OB1 pixel unit and the effective pixel unit of the image pickup device is as shown in FIG. 10, but the pixel arrangement in the OB2 pixel unit is as shown in FIG. 12.

Figure 12:
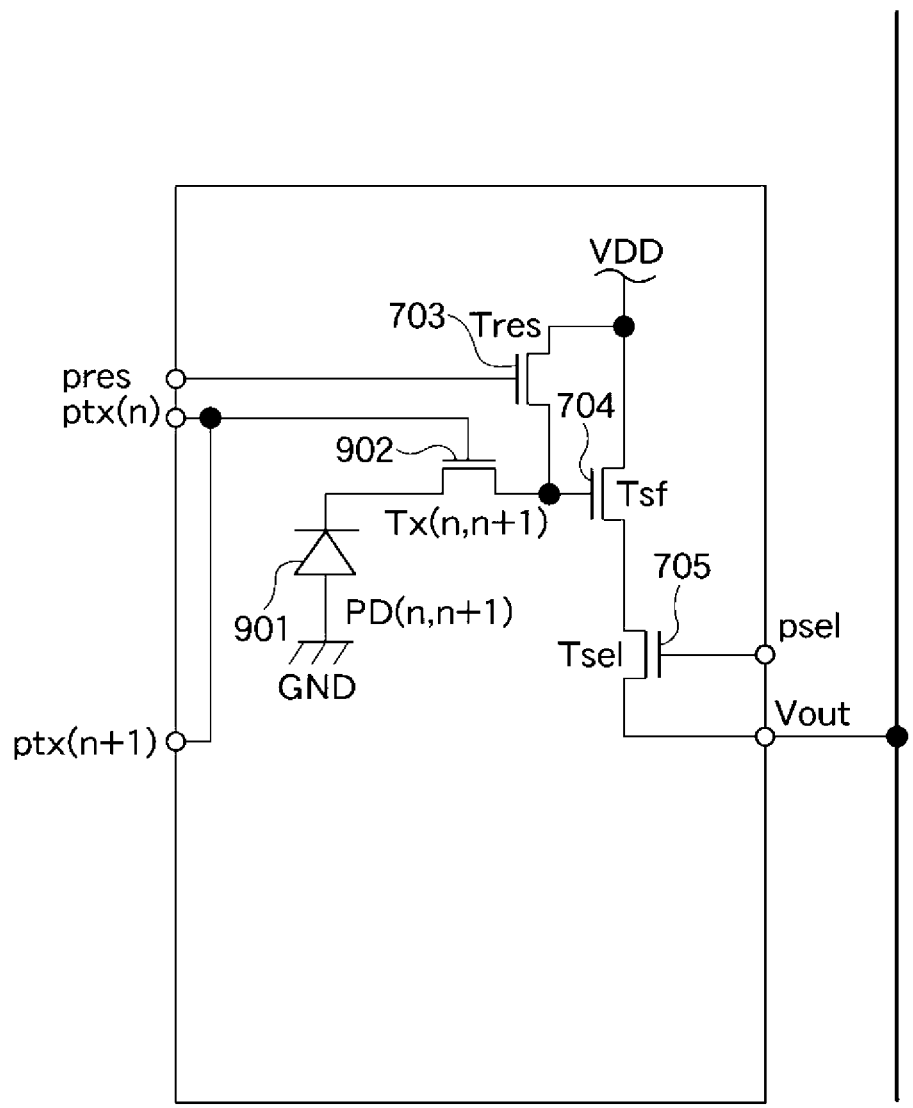
FIG. 12 is a diagram schematically showing a pixel arrangement in an OB2 pixel unit of the image pickup device.

FIG. 12 is a diagram schematically showing the pixel arrangement in the OB2 pixel unit of the image pickup device.

FIG. 12 differs from FIG. 11 in that the nth row and the n+1th row are comprised of a common photodiode (PD (n, n+1)) 901 and a common transfer MOS transistor (Tx (n, n+1)) 902. Namely, the OB1 pixel unit and the effective pixel unit are arranged as shown in FIG. 10, and the OB2 pixel unit is arranged as shown in FIG. 12. It should be noted that in FIG. 12, the same elements as those in FIG. 10 are designated by the same reference symbols, and description thereof is omitted.

With increase in the number of pixels of the image pickup device, the arrangement that the pixel size of the OB2 pixel unit is larger than the pixel size of the OB1 pixel unit as described above in the first embodiment is becoming increasingly difficult. However, the arrangement described above can easily realize the arrangement that the pixel size of the OB2 pixel unit is lager than the pixel size of the OB1 pixel unit.

Although in the example shown in FIG. 11, it is arranged such that two pixels in a vertical direction commonly use a MOS transistor, the present invention is not limited to this. It may be arranged such that two pixels in a horizontal direction commonly use a MOS transistor if possible in terms of arrangement. This arrangement is shown in FIG. 13.

Figure 13:
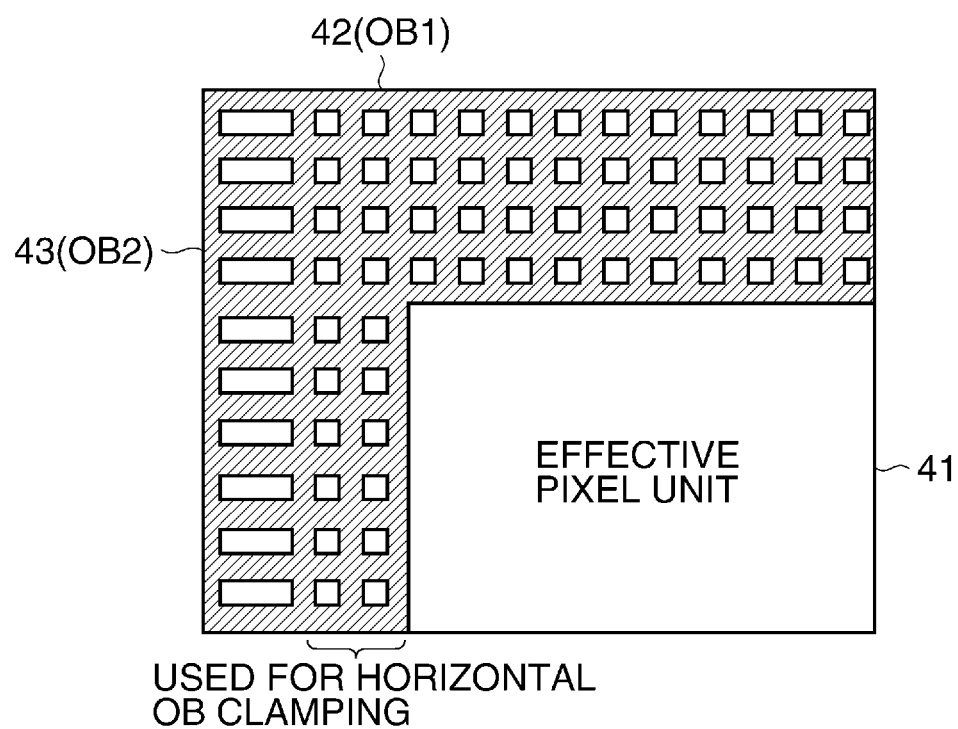
FIG. 13 is a diagram showing a pixel arrangement in a case where horizontal-direction two pixels of the image pickup device commonly use a MOS transistor.

FIG. 13 is a diagram showing a pixel arrangement in a case where horizontal-direction two pixels of the image pickup device commonly use a MOS transistor.

Referring to FIG. 13, the image pickup device has an effective pixel unit 41, an OB1 pixel unit 42, and an OB2 pixel unit 43. The 031 pixel unit 42 is disposed on a left side and an upper side of the effective pixel unit 41. The OB2 pixel unit 43 is disposed on a left side of the OB1 pixel unit 42. A method to measure the amount of dark current in this case can be well imagined, but simply put, the amount of dark current can be obtained from OB2 (n) pixel output−OB1 (n) pixel output.

In a further developed form, it may be arranged such that vertical-direction two pixels and horizontal-direction two pixels commonly use a MOS transistor. This arrangement is shown in FIG. 14.

Figure 14:
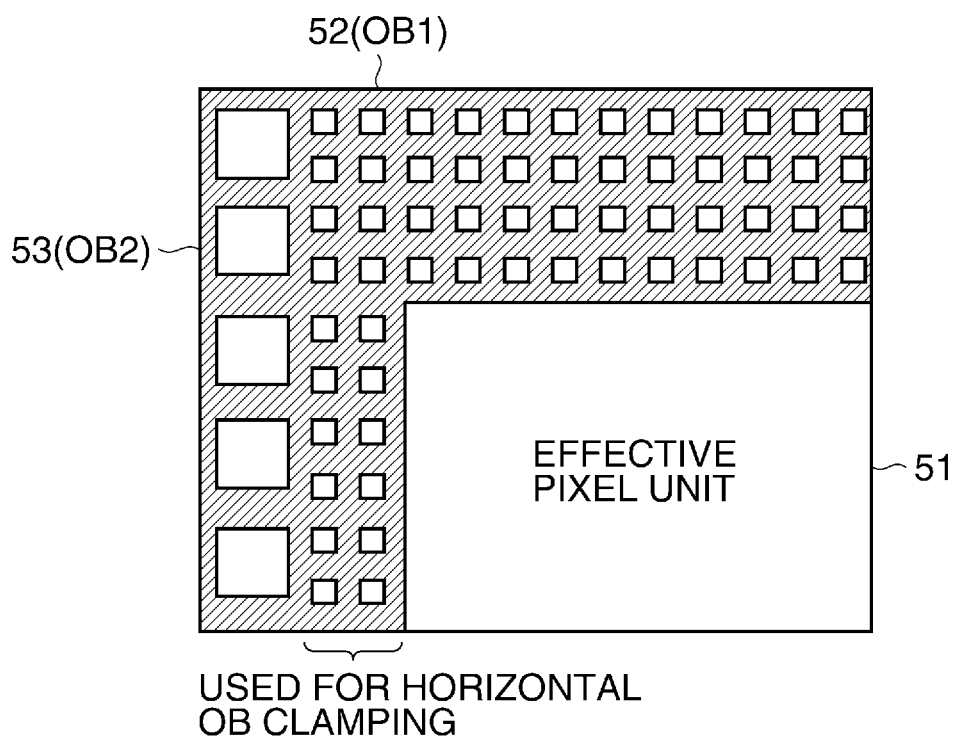
FIG. 14 is a diagram showing a pixel arrangement in a case where horizontal-direction two pixels and vertical-direction two pixels of the image pickup device commonly use a MOS transistor.

FIG. 14 is a diagram showing an exemplary pixel arrangement in a case where horizontal-direction two pixels and vertical-direction two pixels of the image pickup device commonly use a MOS transistor.

Referring to FIG. 14, the image pickup device has an effective pixel unit 51, an OB1 pixel unit 52, and an OB2 pixel unit 53. The OB1 pixel unit 52 is disposed on a left side and an upper side of the effective pixel unit 51. The OB2 pixel unit 53 is disposed on a left side of the OB1 pixel unit 52. With this arrangement, OB2 pixel output−OB1 pixel output, that is, a difference in output can be increased, and hence the amount of dark current can be measured with higher accuracy.

As described above in detail, according to the present embodiment, because the amount of dark current can be accurately measured when the dark image subtraction process and the white defect correction process are performed in the image pickup apparatus, the dark image subtraction process and the white defect correction process can be performed under appropriate dark current conditions. As a result, appropriate image quality of images taken by the image pickup device can be secured.

A third embodiment of the present invention differs from the above described first embodiment in points described below. Other elements of the present embodiment are the same as the corresponding ones of the above described first embodiment, and therefore, description thereof is omitted.

In the first and second embodiments described above, the amount of dark current is measured from OB1 pixel output and OB2 pixel output. Originally, OB1 pixels and OB2 pixels are pixels differing only in pixel size, and hence in a case where the amount of dark current is measured by measuring a difference between OB1 pixel output and OB2 pixel output, it can be well imagined that accuracy is slightly insufficient when the absolute value of dark current is small. Accordingly, an arrangement as shown in FIG. 15 is contemplated so as to realize more accurate measurement of the amount of dark current.

Figure 15:
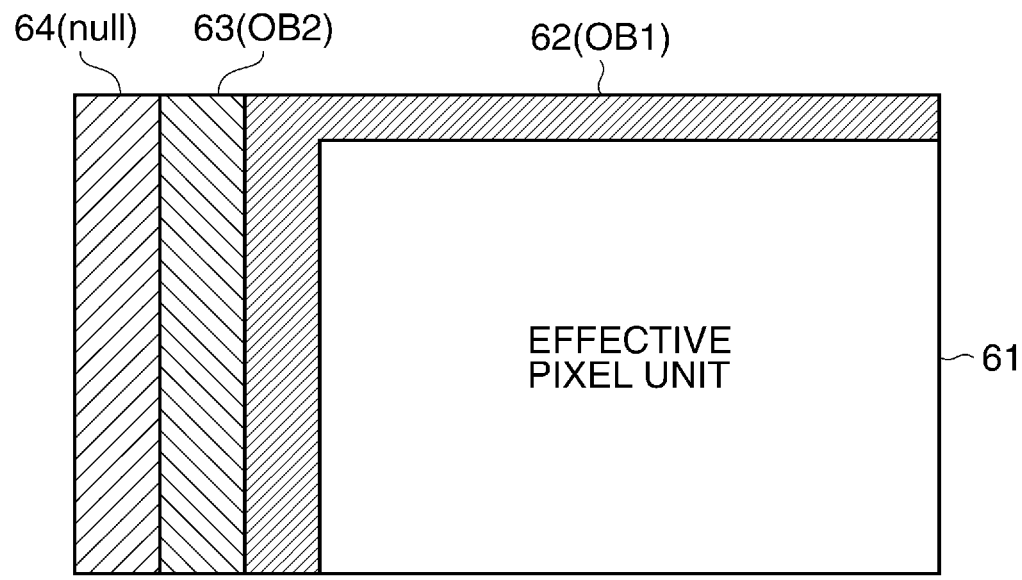
FIG. 15 is a diagram showing an exemplary pixel arrangement of an image pickup device according to a third embodiment of the present invention.

FIG. 15 is a diagram showing an exemplary pixel arrangement of an image pickup device according to the present embodiment.

Referring to FIG. 15, the image pickup device has an effective pixel unit 61, an OB1 pixel unit 62, an OB2 pixel unit 63, and a null pixel unit 64. FIG. 15 differs from FIG. 3 in that the null pixel unit 64 is disposed on a left side of the OB2 pixel unit 63. With this arrangement, when the amount of dark current is relatively small, the amount of dark current can be obtained from null pixel output−OB1 pixel output, and when the amount of dark current is relatively large, the amount of dark current can be obtained from OB2 pixel output−OB1 pixel output.

Figure 16A:
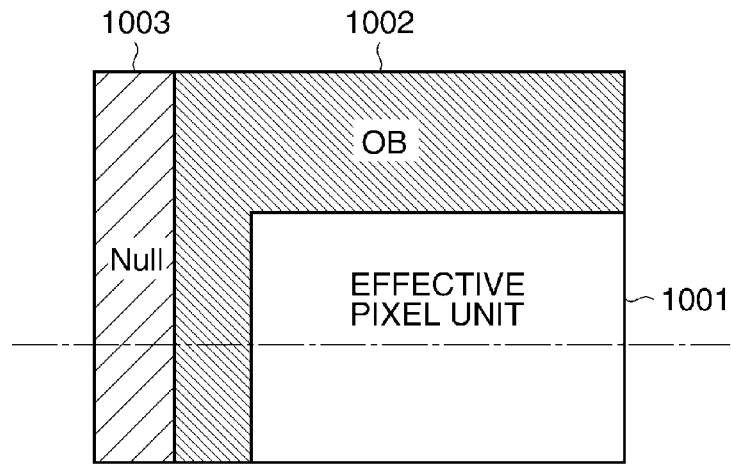
Figure 16B:
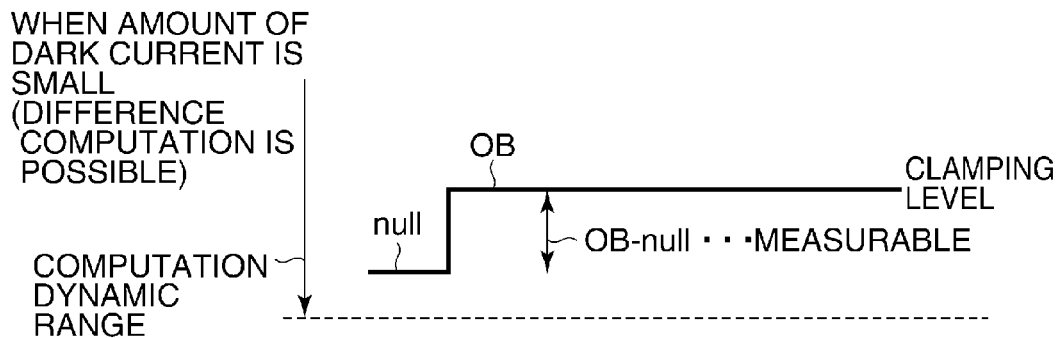
Figure 16C:
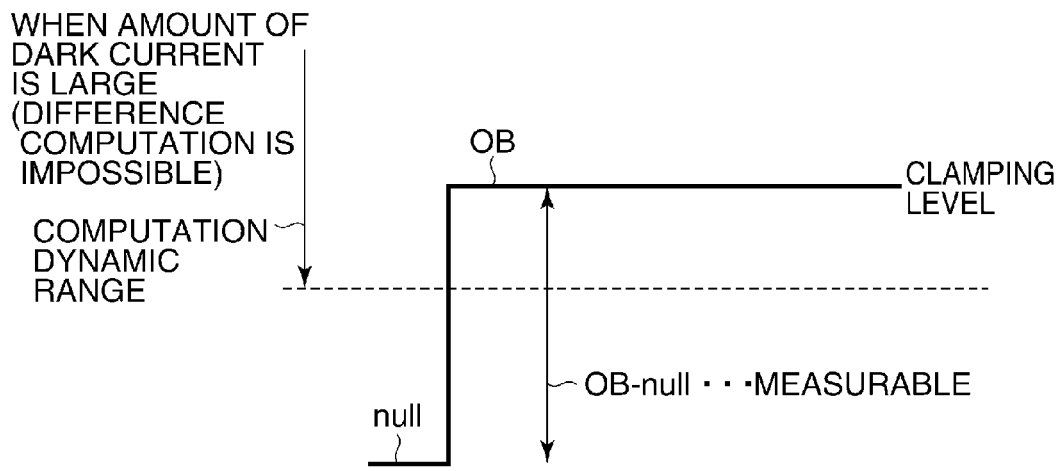

Specifically, as described with reference to FIGS. 16A to 16C, when the amount of dark current is small, null pixel output−OB1 pixel output can be measured because null pixel output is inside the computation dynamic range, but when the amount of dark current is large, null pixel output is outside the computation dynamic range. For this reason, the amount of dark current is measured from OB2 pixel output−OB1 pixel output.

Specifically, when an AD conversion result of null pixel output is higher than a predetermined value, it is determined that null pixel output from null pixels is inside the computation dynamic range, and the amount of dark current is measured from null pixel output and OB1 pixel output. When an AD conversion result of null pixel output is lower than the predetermined value, measured values may be unreliable because null pixel output is outside the computation dynamic range, and hence the amount of dark current is measured from OB2 pixel output and OB1 pixel output. This makes it possible to measure the value of dark current with higher accuracy, and thereafter perform a correcting operation in an appropriate manner.

As described above in detail, according to the present embodiment, because the amount of dark current can be accurately measured when the dark image subtraction process and the white defect correction process are performed in the image pickup apparatus, the dark image subtraction process and the white defect correction process can be performed under appropriate dark current conditions. As a result, appropriate image qualities of images taken by the image pickup device can be secured.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-173000 filed Jul. 24, 2009, which is hereby incorporated by reference herein in its entirety.

What is claimed is:

1. An image pickup apparatus comprising:
an image pickup device comprising a photoelectric conversion element unit that generates signal electric charges according to an amount of received light, a first optical black unit having a light-shielded photoelectric conversion element structure and having first output characteristics, and a second optical black unit having a light-shielded photoelectric conversion element structure and having second output characteristics different from the first output characteristics;
a measurement unit adapted to measure a dark current value of said image pickup device with respect to each of predetermined part units of said image pickup device based on an output from the first optical black unit and an output from the second optical black unit; and
a determination unit adapted to determine, with respect to each of the predetermined part units of said image pickup device, whether to perform image processing according to the dark current value measured with respect to each of the predetermined part units of said image pickup device by said measurement unit.

2. An image pickup apparatus according to claim 1, wherein the image processing includes a white defect correction process in which white spots appearing in an image taken by said image pickup device are corrected.

3. An image pickup apparatus according to claim 1, wherein said measurement unit measures the dark current value of said image pickup device by obtaining a difference between the output from the first optical black unit and the output from the second optical black unit.

4. An image pickup apparatus according to claim 1, wherein said image pickup device further comprises a simulated black reference pixel unit that has no photoelectrical conversion element structure, and
said measurement unit measures the dark current value of said image pickup device by obtaining a difference between the output from the first optical black unit and an output from the simulated black reference pixel unit, or a difference between the output from the first optical black unit and the output from the second optical black unit.

5. An image pickup apparatus according to claim 1, wherein a pixel output from the first optical black unit of said image pickup device serves as a black reference.

6. An image pickup apparatus according to claim 1, wherein the first optical black unit of said image pickup device has an arrangement that outputs from a plurality of photoelectric conversion elements adjacent to each other are transferred to a floating diffusion via switch units and read out, and
the second optical black unit of said image pickup device has an arrangement that an output from a photoelectric conversion element is transferred to a floating diffusion and read out.

7. An image pickup apparatus comprising:
an image pickup device comprising a photoelectric conversion element unit that generates signal electric charges according to an amount of received light, a first optical black unit having a light-shielded photoelectric conversion element structure, and a second optical black unit having a light-shielded photoelectric conversion element structure;
a measurement unit adapted to measure a dark current value of said image pickup device with respect to each of predetermined part units of said image pickup device based on an output from the first optical black unit and an output from the second optical black unit; and
a determination unit adapted to determine, with respect to each of the predetermined part units of said image pickup device, whether to perform image processing according to the dark current value measured with respect to each of the predetermined part units of said image pickup device by said measurement unit,
wherein a photoelectric conversion element area of the second optical black unit is larger than a photoelectric conversion element area of the first optical black unit.

8. An image pickup apparatus according to claim 7, wherein the image processing includes a white defect correction process in which white spots appearing in an image taken by said image pickup device are corrected.

9. An image pickup apparatus according to claim 7, wherein said measurement unit measures the dark current value of said image pickup device by obtaining a difference between the output from the first optical black unit and the output from the second optical black unit.

10. An image pickup apparatus according to claim 7, wherein said image pickup device further comprises a simulated black reference pixel unit that has no photoelectrical conversion element structure, and said measurement unit measures the dark current value of said image pickup device by obtaining a difference between the output from the first optical black unit and an output from the simulated black reference pixel unit, or a difference between the output from the first optical black unit and the output from the second optical black unit.

11. An image pickup apparatus according to claim 7, wherein a pixel output from the first optical black unit of said image pickup device serves as a black reference.

12. An image pickup apparatus according to claim 7, wherein the first optical black unit of said image pickup device has an arrangement that outputs from a plurality of photoelectric conversion elements adjacent to each other are transferred to a floating diffusion via switch units and read out, and
    the second optical black unit of said image pickup device has an arrangement that an output from a photoelectric conversion element is transferred to a floating diffusion and read out.

13. A control method for an image pickup apparatus that takes images using an image pickup device comprising a photoelectric conversion element unit that generates signal electric charges according to an amount of received light, a first optical black unit having a light-shielded photoelectric conversion element structure and having first output characteristics, and a second optical black unit having a light-shielded photoelectric conversion element structure and having second output characteristics different from the first output characteristics, comprising:
    a measurement step of measuring a dark current value of the image pickup device with respect to each of predetermined part units of said image pickup device based on an output from the first optical black unit and an output from the second optical black unit; and
    a determination step of determining, with respect to each of the predetermined part units of said image pickup device, whether to perform image processing according to the dark current value measured with respect to each of the predetermined part units of said image pickup device in said measurement step.

14. A control method for an image pickup apparatus that takes images using an image pickup device comprising a photoelectric conversion element unit that generates signal electric charges according to an amount of received light, a first optical black unit having a light-shielded photoelectric conversion element structure, and a second optical black unit having a light-shielded photoelectric conversion element structure, comprising:
    a measurement step of measuring a dark current value of the image pickup device with respect to each of predetermined part units of said image pickup device based on an output from the first optical black unit and an output from the second optical black unit; and
    a determination step of determining with respect to each of the predetermined part units of said image pickup device, whether to perform image processing according to the dark current value measured with respect to each of the predetermined part units of said image pickup device in said measurement step,
    wherein a photoelectric conversion element area of the second optical black unit is larger than a photoelectric conversion element area of the first optical black unit.

\* \* \* \* \*